US012026375B2

(12) United States Patent
Sato

(10) Patent No.: US 12,026,375 B2
(45) Date of Patent: Jul. 2, 2024

(54) INFORMATION PROCESSING DEVICE, INFORMATION PROCESSING METHOD, AND NON-TRANSITORY COMPUTER-READABLE STORAGE MEDIUM

(71) Applicant: OMRON Corporation, Kyoto (JP)

(72) Inventor: Kenji Sato, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 4 days.

(21) Appl. No.: 17/915,147

(22) PCT Filed: Mar. 8, 2021

(86) PCT No.: PCT/JP2021/008908
§ 371 (c)(1),
(2) Date: Sep. 28, 2022

(87) PCT Pub. No.: WO2021/220618
PCT Pub. Date: Nov. 4, 2021

(65) Prior Publication Data
US 2023/0113409 A1 Apr. 13, 2023

(30) Foreign Application Priority Data
Apr. 28, 2020 (JP) .................. 2020-079371

(51) Int. Cl.
*G06F 12/00* (2006.01)
*G06F 3/06* (2006.01)
(52) U.S. Cl.
CPC .......... *G06F 3/0617* (2013.01); *G06F 3/0653* (2013.01); *G06F 3/0673* (2013.01)

(58) Field of Classification Search
CPC .............. G06F 3/0656; G06F 12/0246; G06F 12/0804; G06F 2212/202; G06F 3/0679; G06F 3/0659
(Continued)

(56) References Cited

U.S. PATENT DOCUMENTS 9,430,114 B1 * 8/2016 Dingman ................ G06F 16/25
9,639,589 B1 * 5/2017 Theimer ................. G06F 21/00
(Continued)

FOREIGN PATENT DOCUMENTS

| JP | 2007-18414 A | 1/2007 |
| JP | 2012-208537 A | 10/2012 |
| JP | 2014-203165 A | 10/2014 |

OTHER PUBLICATIONS

"Design methodologies for telecommunication systems applying soft error measures", International Telecommunication Union, Recommendation ITU-T K.131, Series K: Protection Against Interference, 2022, 42 pages.
(Continued)

*Primary Examiner* — Mohamed M Gebril
(74) *Attorney, Agent, or Firm* — Sughrue Mion, PLLC

(57) ABSTRACT

This information processing device includes: an analysis unit that parses a program assigned to a task which is periodically executed; and an output unit. The analysis unit classifies each of at least one variable used to execute the task into a first group in which a process of reading a value from a memory is performed first and a second group in which a process of writing a value in the memory is performed first. The analysis unit determines that the necessity for a soft error measure for a variable belonging to the first group is greater than the necessity for a soft error measure for a variable belonging to the second group. The
(Continued)

output unit outputs a determination result. Thus, a variable that requires a soft error measure can be identified.

5 Claims, 9 Drawing Sheets

(58) Field of Classification Search
USPC .......................................................... 711/154
See application file for complete search history.

(56) References Cited

U.S. PATENT DOCUMENTS

| 10,083,100 | B1* | 9/2018 | Agetsuma | G06F 11/2094 |
| 10,922,203 | B1* | 2/2021 | Alben | G06F 1/04 |
| 2003/0212924 | A1* | 11/2003 | Avvari | G06F 11/3676 |
| | | | | 714/E11.208 |
| 2006/0253496 | A1* | 11/2006 | Hunter | G06F 16/80 |
| 2009/0327343 | A1* | 12/2009 | McCormack | G06F 16/258 |
| 2016/0371145 | A1* | 12/2016 | Akutsu | G06F 3/067 |
| 2017/0293697 | A1* | 10/2017 | Youshi | G06F 16/84 |
| 2019/0310925 | A1* | 10/2019 | Yoshida | G06F 3/065 |
| 2020/0210291 | A1* | 7/2020 | Yamamoto | G06F 11/1076 |
| 2020/0211664 | A1* | 7/2020 | Vashi | G06F 11/3034 |
| 2021/0255805 | A1* | 8/2021 | Harata | H04L 12/403 |
| 2022/0350510 | A1* | 11/2022 | Tsukioka | G06F 11/2089 |
| 2023/0113409 | A1* | 4/2023 | Sato | G06F 3/0653 |
| | | | | 711/154 |

OTHER PUBLICATIONS

International Search Report for PCT/JP2021/008908 dated May 18, 2021.

Written Opinion for PCT/JP2021/008908 dated May 18, 2021.

Yohan Ko et al., "Protecting Caches from Soft Errors: A Microarchitect's Perspective", ACM Transactions on Embedded Computing Systems, May 2017, vol. 16, No. 4, Article 93, pp. 1-28 (28 pages total).

Christian Fibich et al., "Vulnerability Analysis of Storage Elements in HLS-Generated Designs Using High-Level Profiling", 2017 2nd International Conference on System Reliability and Safety, IEEE, 2017, pp. 190-194 (5 pages).

Extended European Search Report dated Apr. 16, 2024, issued in European Application No. 21795703.4.

* cited by examiner

FIG.9

| FIRST GROUP | SECOND GROUP |
|---|---|
| st_io_comm_established | tx_buf |
| st_rx_pdo | st_io_error_info |
| ⋮ | ⋮ |

FIG.10

| VARIABLE | SIZE | NECESSITY FOR SOFT ERROR MEASURE | DESCRIPTION |
|---|---|---|---|
| tx_buf | 16Byte | SMALL | Write FIRST |
| st_io_error_info | 44Byte | SMALL | Write FIRST |
| st_io_comm_established | 32Byte | GREAT | Read FIRST |
| st_rx_pdo | 16Byte | GREAT | Read FIRST |
| ⋮ | ⋮ | ⋮ | ⋮ |

FIG.12

| VARIABLE | SIZE | NECESSITY FOR SOFT ERROR MEASURE | DESCRIPTION |
|---|---|---|---|
| VARIABLE d | 16Byte | MEDIUM (LEVEL 1) | Write FIRST (WAIT FOR TIME TA UNTIL Read) |
| VARIABLE e | 16Byte | MEDIUM (LEVEL 2) | Write FIRST (WAIT FOR TIME TB (> TA) UNTIL Read) |
| VARIABLE f | 32Byte | MEDIUM (LEVEL 3) | Write FIRST (WAIT FOR TIME TB + TC UNTIL Read) |
| VARIABLE g | 32Byte | SMALL | Write FIRST (NO STANDBY TIME UNTIL Read) |
| : | : | : | : |

INFORMATION PROCESSING DEVICE, INFORMATION PROCESSING METHOD, AND NON-TRANSITORY COMPUTER-READABLE STORAGE MEDIUM

CROSS REFERENCE TO RELATED APPLICATIONS

This application is a National Stage of International Application No. PCT/JP2021/008908 filed Mar. 8, 2021, claiming priority based on Japanese Patent Application No. 2020-079371 filed Apr. 28, 2020, the contents of each of which being incorporated by reference herein in their entireties.

TECHNICAL FIELD

The present disclosure relates to an information processing device, an information processing method, and a program.

BACKGROUND ART

Transient bit errors (soft errors) in memories have been rapidly increasing with high integration and miniaturization of semiconductor devices. The soft error is generated, for example, by collision of a particles or cosmic ray neutrons. When a memory in which a soft error may occur is applied to a system, a temporary shutdown of the system due to the soft error may occur.

From such a background, Japanese Patent Laying-Open No. 2007-18414 (PTL 1) discloses a control device that writes the same data to each of three or more different addresses in a random access memory (RAM) when rewriting variable data of the RAM. In addition, a soft error measure recommendation that defines design, evaluation, and quality criteria regarding soft error measures has been approved by ITU-T (International Telecommunication Union-Telecommunication Standardization Sector) (see NPL 1).

CITATION LIST

Patent Literature

PTL 1: Japanese Patent Laying-Open No. 2007-18414

Non Patent Literature

NPL 1: International Telecommunication Union, "K.131: Design methodologies for telecommunication systems applying soft error measures", [online], Jan. 13, 2018, [searched on Apr. 13, 2020], Internet <URL:https://www.itu.int/rec/T-REC-K.131-201801-I/en>

SUMMARY OF INVENTION

Technical Problem

When the soft error measure described in PTL 1 is applied to all variables, a memory having a large capacity is required, which leads to an increase in cost. Therefore, it is preferable to apply, for example, the soft error measure described in PTL 1 only to a variable having high necessity for the soft error measure. However, NPL 1 suggests extracting a portion in the memory where soft error measures are necessary, but does not describe a specific method thereof.

The present disclosure has been accomplished in view of the above problems, and an object of the present disclosure is to provide an information processing device, an information processing method, and a program with which it is possible to identify a variable that requires a soft error measure.

Solution to Problem

According to an example of the present disclosure, an information processing device includes: an analysis unit configured to parse a program assigned to a task that is periodically executed by a task execution device; and an output unit configured to output an analysis result by the analysis unit. The analysis unit includes an extraction unit, a classification unit, and a determination unit. The extraction unit is configured to extract at least one variable used to execute the task. The classification unit is configured to classify each of the at least one variable into a first group in which a process of reading a value from a memory is performed first during execution of the task and a second group in which a process of writing a value to the memory is performed first during execution of the task. The determination unit is configured to determine that necessity for a soft error measure for a variable belonging to the first group is greater than necessity for the soft error measure for a variable belonging to the second group. The output unit outputs a determination result by the determination unit.

According to this disclosure, each of the at least one variable is classified into either the first group or the second group. The value of a variable classified into the second group is first written into the memory during the execution of the task. Therefore, even if a soft error occurs in the memory between the end of the task and the start of the task in the next cycle, there is no influence of the soft error, because the value is written in the next cycle.

On the other hand, the value of a variable classified into the first group is first read from the memory during the execution of the task. Therefore, in a case where a soft error occurs in the memory between the end of the task and the start of the task in the next cycle, a corrupted value is read and the calculation is executed using the corrupted value. As a result, an abnormality may occur in a control system.

In view of this, it is determined that the necessity for the soft error measure for the variable belonging to the first group is greater than the necessity for the soft error measure for the variable belonging to the second group, and the determination result is output. Thus, a user can identify the variable belonging to the first group as a variable that needs the soft error measure.

In the above disclosure, the at least one variable includes a first variable and a second variable that belong to the second group. The determination unit determines that necessity for the soft error measure for the first variable is greater than necessity for the soft error measure for the second variable according to the program including a first command to first write a value of the first variable into the memory, a second command to wait for a first prescribed time after the first command, a third command to read the value of the first variable from the memory after the second command, a fourth command to first write a value of the second variable into the memory, a fifth command to wait for a second prescribed time shorter than the first prescribed time after the fourth command, and a sixth command to read the value of the second variable from the memory after the fifth command.

According to this disclosure, the necessity for the soft error measure is determined to be greater for a variable having a longer prescribed time of the command to wait between the command to first write the value in the memory and the command to read the value from the memory.

In the above disclosure, the at least one variable includes a first variable and a second variable that belong to the second group. The determination unit determines that necessity for the soft error measure for the first variable is greater than necessity for the soft error measure for the second variable according to the program including a first command to first write a value of the first variable into the memory, a second command to wait for a first prescribed time after the first command, a third command to read the value of the first variable from the memory after the second command, a fourth command to first write a value of the second variable into the memory, and a fifth command to read the value of the second variable from the memory after the fourth command, and not including a command to wait for a prescribed time between the fourth command and the fifth command. With this configuration, the necessity for the soft error measure can be determined minutely for the variable belonging to the first group.

According to this disclosure, the necessity for the soft error measure for the variable for which the command to wait for a prescribed time is executed between the command to write the value to the memory and the command to read the value from the memory among the variables belonging to the first group is determined to be greater than that for the other variables. With this configuration, the necessity for the soft error measure can be determined minutely for the variable belonging to the first group.

According to an example of the present disclosure, an information processing method performed by the information processing device includes: parsing a program assigned to a task that is periodically executed by a task execution device; and outputting a parsing result. The parsing includes: (i) extracting at least one variable used to execute the task; (ii) classifying each of the at least one variable into a first group in which a process of reading a value from a memory is performed first during execution of the task and a second group in which a process of writing a value to the memory is performed first during execution of the task, and (iii) determining that necessity for a soft error measure for a variable belonging to the first group is greater than necessity for the soft error measure for a variable belonging to the second group. The outputting includes outputting a determination result by the determining.

According to an example of the present disclosure, a program causes a computer to execute the above information processing method. According to these disclosures, a variable that requires a soft error measure can also be identified.

Advantageous Effects of Invention

According to the present disclosure, it is possible to identify a variable that requires a soft error measure.

BRIEF DESCRIPTION OF DRAWINGS

FIG. 9 is a diagram illustrating an example of a classification result of variables.

FIG. 10 is a diagram illustrating an example of a determination result displayed on a display.

FIG. 12 is a diagram illustrating an example of a determination result in a modification.

DESCRIPTION OF EMBODIMENTS

Figure 1:
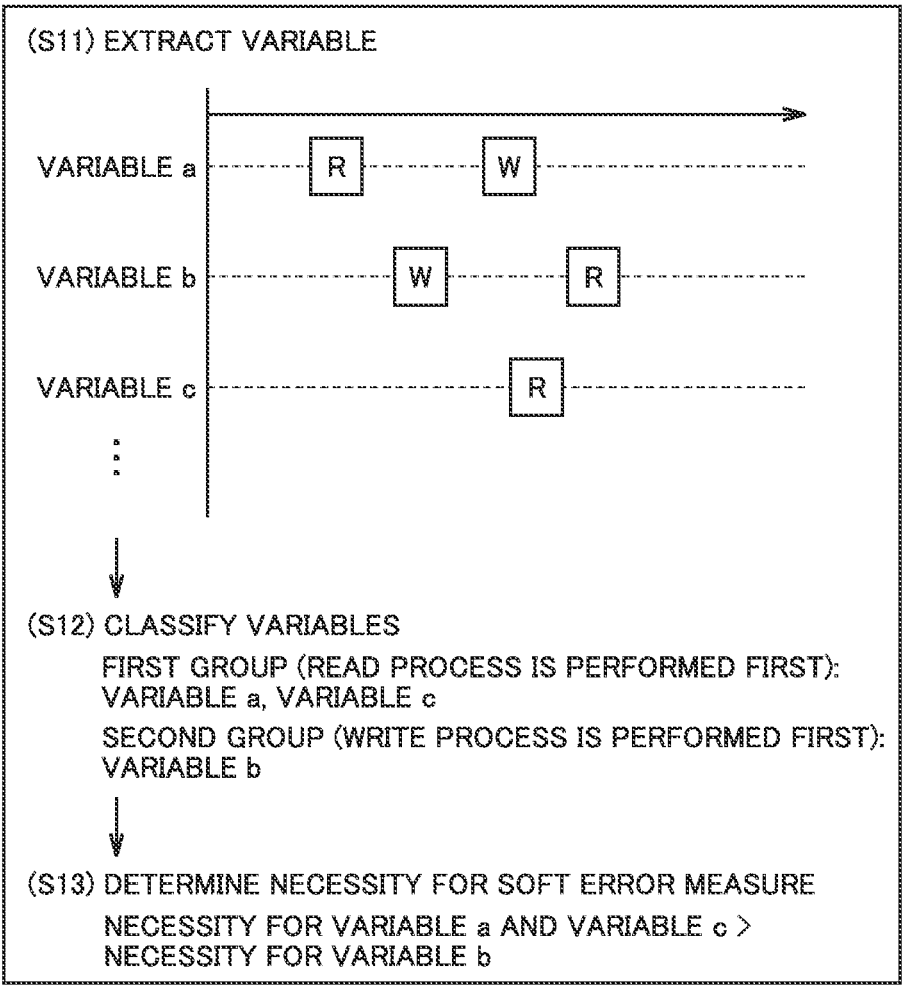
FIG. 1 is a schematic diagram illustrating an application example of an information processing device according to an embodiment of the present disclosure.

An embodiment of the present disclosure will now be described in detail with reference to the drawings. The same or corresponding parts in the drawings are denoted by the same reference signs, and the description thereof will not be repeated.

§ 1 Application Example

In various fields such as aerospace systems, automobiles, medical equipment, communication equipment, and industrial equipment, it is desirable to suppress a temporary shutdown of a system due to a soft error of a memory. The present disclosure can be applied to systems in such various fields. In the following, a control system incorporated in a factory automation (FA) field will be described as an application example of the present disclosure, but the application example of the present disclosure is not limited to the control system.

A control system used in the FA field includes, for example, a programmable logic controller (PLC). The PLC executes each of one or more tasks at a predetermined cycle.

The PLC includes a processor, a storage, and a memory. The processor executes one or more tasks according to a control target by executing various programs stored in the storage. A program is assigned to each task in advance. The processor executes the program assigned to each task at a predetermined cycle.

Values of one or more variables used to execute each task are held in the memory. The processor reads the value of the variable from the memory or writes the value of the variable into the memory according to a command included in the program assigned to the task.

When a soft error occurs in the memory included in the PLC, data corruption occurs in the value of the variable. Such data corruption may cause an abnormality in the control system. To address this problem, it is considered to apply a measure for writing the same data indicating the value of the variable to each of three or more different addresses in the memory as described in PTL 1, for example. However, if the same data is written to each of three or more different addresses in the memory for all the variables, a memory having a large capacity is required, which leads to an increase in cost. Therefore, it is preferable to apply, for example, the measure described in PTL 1 only to a variable having high necessity for a soft error measure. In view of this, the control system according to the present embodiment includes an information processing device that determines the necessity for a soft error measure. FIG. 1 is a schematic diagram illustrating an application example of the information processing device according to the present embodiment. FIG. 1 illustrates a flow of an information processing method performed by the information processing device.

As illustrated in FIG. 1, the information processing method includes step S1 for parsing the program assigned to each task executed in the PLC, and step S2 for outputting an analysis result.

Step S1 includes steps S11 to S13. Step S11 is a step for extracting one or more variables used to execute the task. In FIG. 1, variables a to c are extracted.

Step S12 is a step for classifying each of the extracted one or more variables into a first group in which a read process of reading a value from the memory is performed first during the execution of the task and a second group in which a write process of writing the value to the memory is performed first during the execution of the task.

In FIG. 1, "R" indicates the read process, and "W" indicates the write process. As illustrated in FIG. 1, for variables a and c, the read process of reading values from the memory is executed first during the execution of the task. For variable b, the write process of writing the value to the memory is first executed during the execution of the task. Therefore, variables a and c are classified into the first group, and variable b is classified into the second group.

Step S13 is a step for determining that the necessity for the soft error measure for variables a and c belonging to the first group is greater than the necessity for the soft error measure for variable b belonging to the second group.

Step S2 includes step S21. Step S21 is a step for outputting the determination result of step S13. For example, the determination result is displayed on a display.

According to the above information processing method, each of one or more variables is classified into either the first group or the second group. The value of a variable classified into the second group is first written into the memory during the execution of the task. Therefore, even if a soft error occurs in the memory between the end of the task and the start of the task in the next cycle, there is no influence of the soft error, because the value is written in the next cycle.

On the other hand, the value of a variable classified into the first group is first read from the memory during the execution of the task. Therefore, in a case where a soft error occurs in the memory between the end of the task and the start of the task in the next cycle, a corrupted value is read and the calculation is executed using the corrupted value. As a result, an abnormality may occur in a control system.

In view of this, it is determined that the necessity for the soft error measure for the variable belonging to the first group is greater than the necessity for the soft error measure for the variable belonging to the second group, and the determination result is output. Thus, a user can identify the variable belonging to the first group as a variable that needs the soft error measure.

§ 2 Specific Example

<Overall Configuration of Control System>

Figure 2:
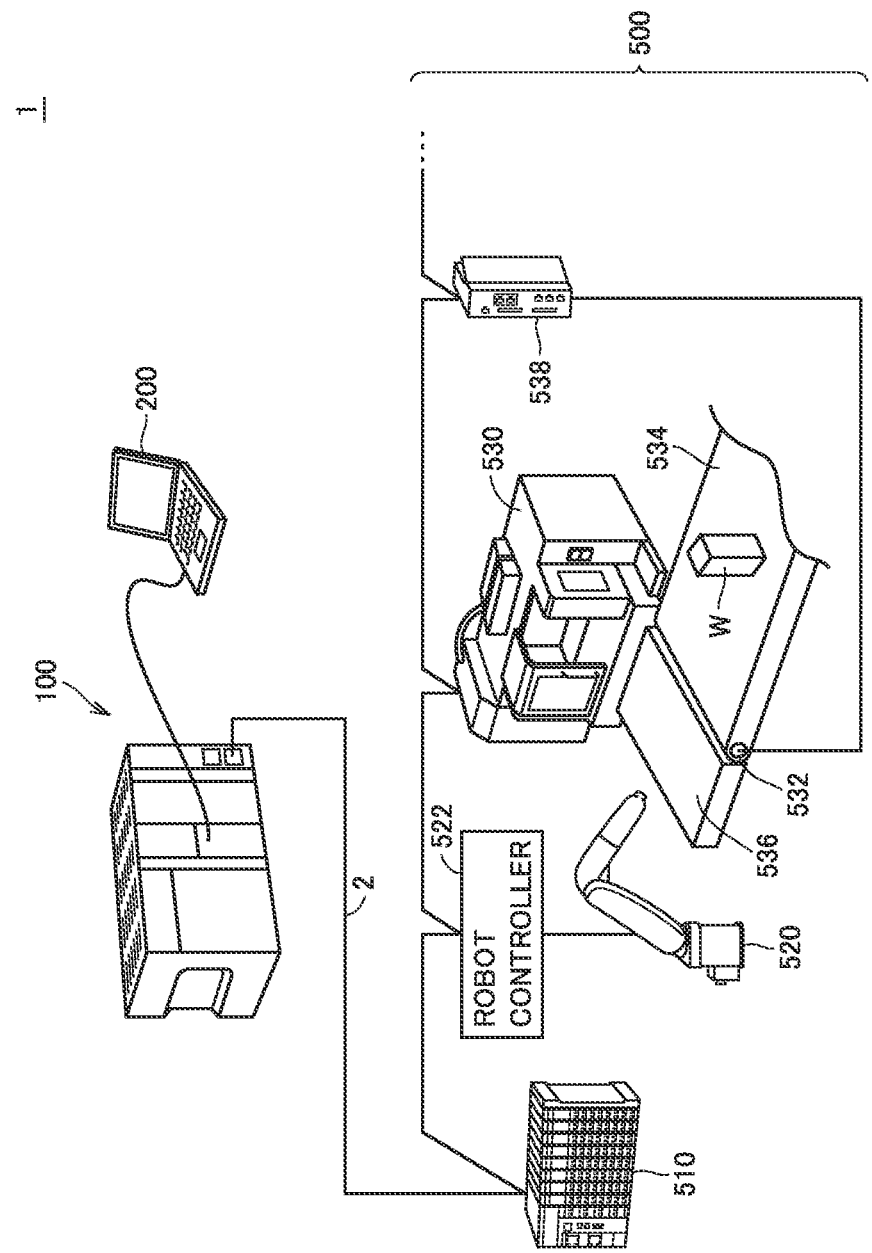
FIG. 2 is a schematic diagram illustrating an example of the overall configuration of a control system according to the embodiment.

First, an example of the overall configuration of a control system 1 including an information processing device 200 according to the present embodiment will be described. FIG. 2 is a schematic diagram illustrating an example of the overall configuration of control system 1 according to the present embodiment.

Referring to FIG. 2, control system 1 includes a control device 100, information processing device 200, and a field device 500.

Control device 100 corresponds to an industrial controller that controls a control target such as various facilities and devices. Control device 100 is a kind of computer that executes control calculation as described later, and may be typically embodied as a programmable logic controller (PLC). Control device 100 is a task execution device that periodically executes one or more tasks for controlling the control target.

Control device 100 may be connected to various field devices 500 via a field network 2. Control device 100 exchanges data with one or a plurality of field devices 500 via field network 2 or the like. In general, the "field network" is also referred to as a "field bus", but for simplification of description, it is collectively referred to as a "field network" in the following description. That is, the "field network" in the present specification is a concept that may include a "field bus" in addition to a "field network" in a narrow sense.

Field network 2 preferably employs a bus or a network capable of periodic communication. EtherCAT (registered trademark), EtherNet/IP (registered trademark), DeviceNet (registered trademark), CompoNet (registered trademark), and the like are known as a bus or a network that performs such periodic communication.

Any field device 500 can be connected to field network 2. Field device 500 includes an actuator that gives some physical action to a manufacturing device, a production line, and the like (hereinafter, they are also collectively referred to as a "field"), an input/output device that exchanges information with the field, and the like.

Data is exchanged between control device 100 and field device 500 via field network 2, and the exchanged data is updated in a very short cycle on the order of several hundreds of μsec to several tens of msec. Such data exchange includes a process of transmitting data (also referred to as "input data" below) collected or generated in field device 500 to control device 100 and a process of transmitting data (also referred to as "output data" below) such as a control command from control device 100 to field device 500. The update processing of the data exchanged in this manner is also referred to as input/output refresh processing.

In the configuration example illustrated in FIG. 2, field device 500 includes a remote input/output (I/O) device 510, a robot 520, a robot controller 522, a CNC machine tool 530, a servo driver 538, and a servomotor 532.

Servomotor 532 drives a conveyor 534 to convey a workpiece W to a workpiece table 536 disposed in front of CNC machine tool 530. Robot 520 places workpiece W before being processed on workpiece table 536 into CNC machine tool 530, and removes and places workpiece W which has been processed in CNC machine tool 530 onto workpiece table 536.

Field device 500 is not limited thereto, and may be any device (for example, a visual sensor or the like) that collects input data, any device (for example, an inverter device or the like) that provides some action according to output data, and the like.

Remote I/O device 510 typically includes a communication coupler that performs communication via field network 2, and an input/output unit (also referred to as an "I/O unit" below) for acquiring input data and outputting output data.

Remote I/O device 510 is connected with a device that collects input data such as an input relay and various sensors (for example, an analog sensor, a temperature sensor, a vibration sensor, or the like), and a device that gives some action to the field such as an output relay, a contactor, a servo driver, and any other actuators.

Robot controller 522 performs trajectory calculation, angle calculation of each axis, and the like in accordance with a control command (position command, speed command, or the like) from control device 100, and drives the servomotor or the like constituting robot 520 in accordance with the calculation result.

CNC machine tool 530 machines any object by controlling a machining center or the like according to a program for specifying a position, a speed, and the like. CNC machine tool 530 typically includes a machining device such as a lathe machine, a milling machine, or an electrical discharge machine.

Servo driver 538 drives servomotor 532 in accordance with a control command (for example, a position command, a speed command, or the like) from control device 100.

Control device 100 may be connected to another device via a higher order network. Ethernet (registered trademark) or EtherNet/IP (registered trademark), which is a general network protocol, may be employed as the higher order network. More specifically, control device 100 may be connected to one or more server devices and one or more display devices via the higher order network.

Information processing device 200 is connectable to control device 100. Information processing device 200 provides a function of parsing a program assigned to a task periodically executed by control device 100 and outputting an analysis result. Furthermore, information processing device 200 may provide a development environment (program creating/editing tool, parser, compiler, and the like) of a program executed by control device 100, a setting environment for setting parameters (configurations) of control device 100 and various devices connected to control device 100, a function of outputting the generated program to control device 100, a function of correcting and changing the program executed on control device 100 online, and the like.

Hardware Configuration Example of Control Device

Figure 3:
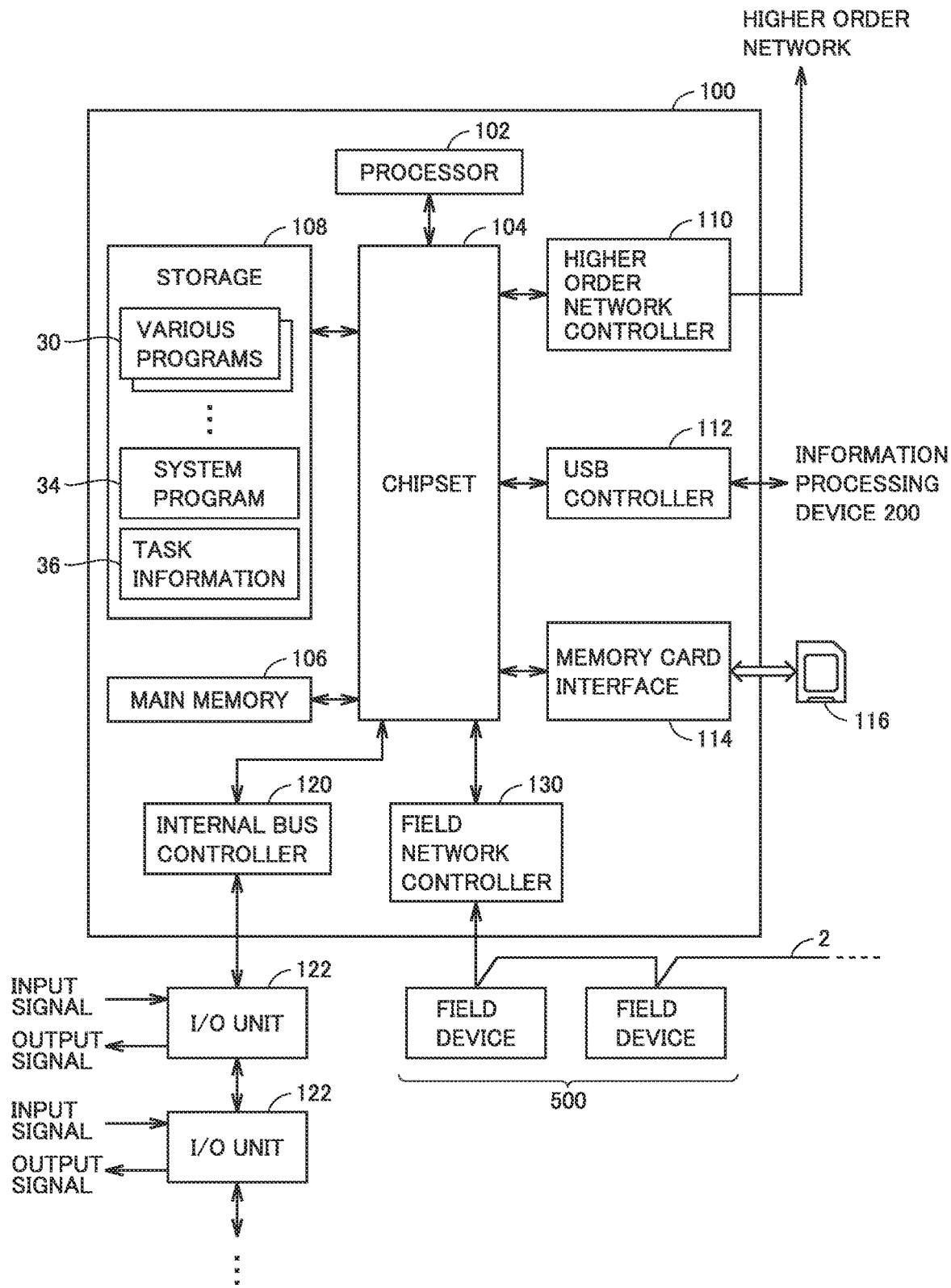
FIG. 3 is a block diagram illustrating a hardware configuration example of a control device according to the embodiment.

Next, a hardware configuration example of control device 100 according to the present embodiment will be described. FIG. 3 is a block diagram illustrating a hardware configuration example of control device 100 according to the present embodiment.

Referring to FIG. 3, control device 100 is an arithmetic processing unit called a CPU unit, and includes a processor 102, a chipset 104, a main memory 106, a storage 108, a higher order network controller 110, a universal serial bus (USB) controller 112, a memory card interface 114, an internal bus controller 120, and a field network controller 130.

Processor 102 includes a central processing unit (CPU), a micro processing unit (MPU), a graphics processing unit (GPU), and the like. As processor 102, a configuration including a plurality of cores may be used, or a plurality of processors 102 may be disposed. That is, control device 100 includes one or more processors 102 and/or processor 102 having one or more cores. Chipset 104 controls processor 102 and peripheral elements to implement processing of control device 100 as a whole.

Main memory 106 includes a volatile storage device such as a dynamic random access memory (DRAM) or a static random access memory (SRAM). The SRAM uses a flip-flop as a structure of a storage unit, and has an advantage of being operated at a higher speed than the DRAM without requiring a refresh operation. Therefore, the SRAM is preferably used as main memory 106.

A DRAM having a stacked structure has high soft error resistance. On the other hand, a SRAM having a flip-flop structure has reduced soft error resistance due to miniaturization. Therefore, when main memory 106 constituted by SRAM is used, a soft error may occur in main memory 106. In the following, it is assumed that the SRAM is used for main memory 106.

Storage 108 includes, for example, a non-volatile storage device such as a hard disk drive (HDD) or a solid state drive (SSD).

Processor 102 reads various programs 30 stored in storage 108, expands the programs in main memory 106, and executes the programs, thereby implementing control according to the control target and various kinds of processing as described later. Storage 108 further stores a system program 34 for achieving basic functions and task information 36. Task information 36 includes information regarding each of one or more tasks to be executed in control device 100.

Higher order network controller 110 controls data exchange with other devices via the higher order network. USB controller 112 controls data exchange with information processing device 200 via USB connection.

Memory card interface 114 is configured such that memory card 116 is attachable thereto and detachable therefrom, so that memory card interface 114 can write data to memory card 116 and read various kinds of data (user program, trace data, etc.) from memory card 116.

Internal bus controller 120 controls data exchange with I/O unit 122 mounted on control device 100. Field network controller 130 controls data exchange with field devices via field network 2.

Figure 4:
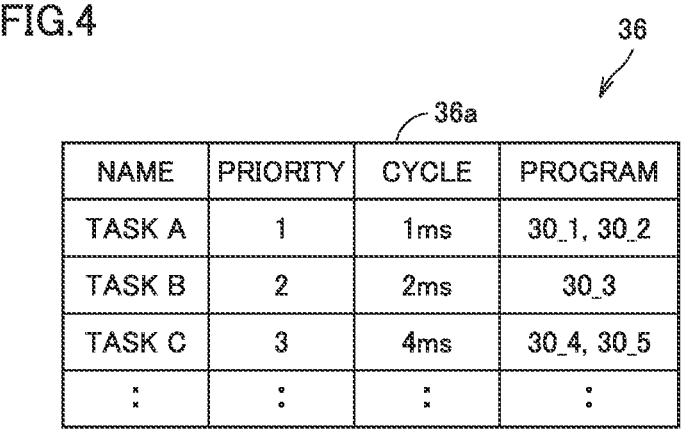
FIG. 4 is a diagram illustrating an example of task information.

FIG. 4 is a diagram illustrating an example of task information 36. As illustrated in FIG. 4, task information 36 indicates, for each of one or more tasks to be executed in control device 100, a task name, priority, a cycle at which the task is executed, and a program assigned to the task. In the example illustrated in FIG. 4, the smaller the value of the priority, the higher the priority.

Processor 102 preferentially executes a task having higher priority. In addition, processor 102 adopts a control cycle of a preset time interval (for example, 1 ms) as a common cycle of the entire processing.

In the example illustrated in FIG. 4, processor 102 executes programs 30_1 and 30_2 assigned to task A at a cycle of 1 ms (the same cycle as the control cycle). In a case where task A and tasks B and C overlap, processor 102 executes task A in preference to tasks B and C.

Processor 102 executes a program 30_3 assigned to task B at a cycle of 2 ms (cycle twice the control cycle). When task B and task C overlap, processor 102 executes task B in preference to task C.

Processor 102 executes programs 30_4 and 30_5 assigned to task C at a cycle of 4 ms (cycle four times the control cycle). In a case where task C and another task having a priority value larger than that of task C overlap with each other, processor 102 executes task C in preference to the other task.

Figure 5:
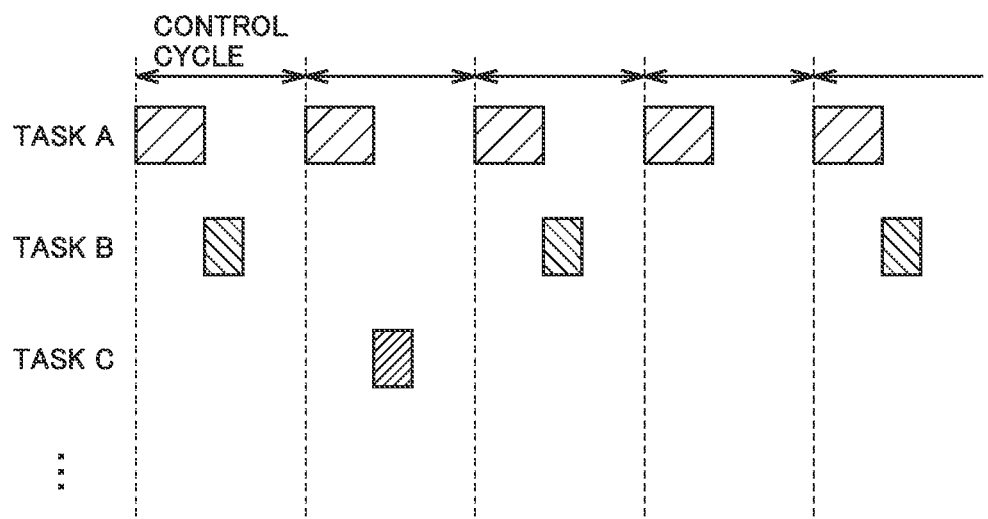
FIG. 5 is a diagram illustrating an execution status of tasks in accordance with the task information illustrated in FIG. 4.

FIG. 5 is a diagram illustrating an execution status of tasks in accordance with task information 36 illustrated in FIG. 4. As illustrated in FIG. 5, task A is executed in the same cycle as the control cycle. Since the priority of task A is the highest, the execution of task A is started in synchronization with the start timing of the control cycle.

Task B is executed in a cycle twice the control cycle. However, at the start timing of the control cycle, task A having higher priority than task B is started to be executed. Therefore, the execution of task B is started after the end of task A.

Task C is executed in a cycle four times the control cycle. However, at the start timing of the control cycle, task A having higher priority than task C is started to be executed. In addition, task B having higher priority than task C may be started after task A. Therefore, the execution of task C is started after the end of the task having priority higher than that of task C.

<Hardware Configuration of Information Processing Device>

Figure 6:
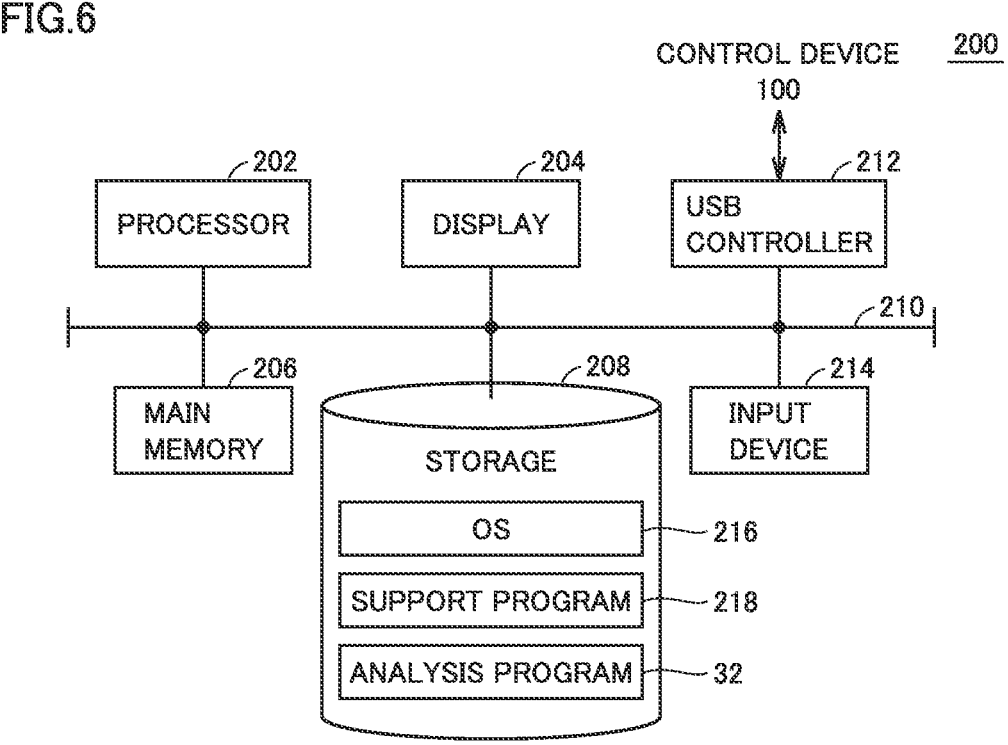
FIG. 6 is a block diagram illustrating a hardware configuration example of the information processing device according to the embodiment.

Next, a hardware configuration example of information processing device 200 according to the present embodiment will be described. FIG. 6 is a block diagram illustrating a hardware configuration example of information processing device 200 according to the present embodiment.

Referring to FIG. 6, information processing device 200 is typically achieved by an analysis program 32 being executed on a personal computer having a general-purpose architecture. More specifically, referring to FIG. 6, information processing device 200 includes a processor 202, a display 204, a main memory 206, a storage 208, a USB controller 212, and an input device 214. These components are connected via an internal bus 210.

Processor 202 is constituted by a CPU, an MPU, a GPU, or the like, and reads various programs including an OS 216 and analysis program 32 stored in storage 208, expands the programs in main memory 206, and executes the programs, thereby implementing various functions to be described later. Main memory 206 includes a volatile storage device such as a DRAM or an SRAM. Storage 208 includes, for example, a non-volatile storage device such as an HDD or an SSD.

As illustrated in FIG. 6, storage 208 of information processing device 200 may store a support program 218 for providing a development environment of a program executed in control device 100.

Display 204 is a device that displays a calculation result by processor 202 or the like, and includes, for example, a liquid crystal display (LCD) or the like.

USB controller 212 controls data exchange with control device 100 via USB connection.

Input device 214 is a device that receives a user's operation, and includes, for example, a keyboard, a memory, and the like.

Example of Functional Configuration of Information Processing Device

Figure 7:
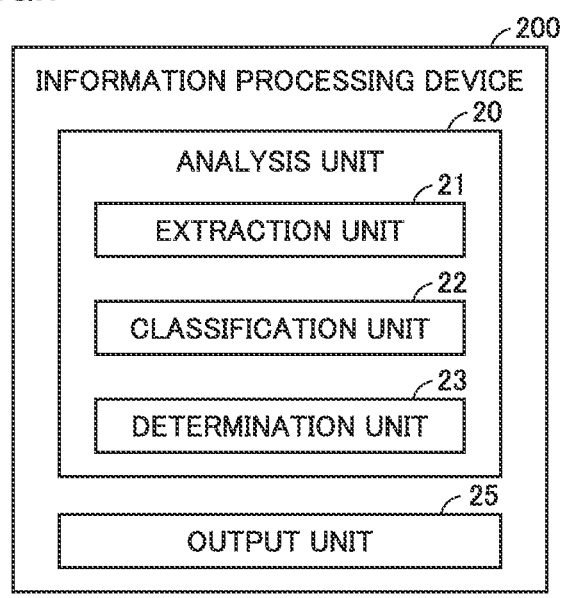
FIG. 7 is a block diagram illustrating an example of functional configuration of the information processing device according to the embodiment.

Next, a functional configuration example of information processing device 200 according to the present embodiment will be described. FIG. 7 is a block diagram illustrating an example of functional configuration of information processing device 200 according to the present embodiment. Each module illustrated in FIG. 7 is typically implemented by processor 202 of information processing device 200 executing analysis program 32.

As illustrated in FIG. 7, information processing device 200 includes an analysis unit 20 that parses the program assigned to each task and an output unit 25 that outputs the analysis result by analysis unit 20. Analysis unit 20 includes an extraction unit 21, a classification unit 22, and a determination unit 23.

Extraction unit 21 parses the program assigned to each task to extract one or more variables used to execute the task. Specifically, extraction unit 21 specifies, from the program, a command for writing values of variables into the memory and a command for reading values of variables from the memory. Extraction unit 21 extracts a variable to be a target of the specified command.

Classification unit 22 classifies each of one or more variables extracted by extraction unit 21 into a first group in which a read process of reading the value from the memory is performed first during the execution of the task and a second group in which a write process of writing the value to the memory is performed first during the execution of the task. Specifically, classification unit 22 parses the program assigned to each task to thereby specify the execution order of the plurality of commands included in the program. Classification unit 22 classifies each of the extracted one or more variables into the first group and the second group depending on whether the command to be executed first is a read command or a write command among one or more commands including the variable. That is, classification unit 22 classifies variables to be targets of the command to first read values from the memory into the first group, and classifies variables to be the targets of the command to first write values into the memory into the second group.

Determination unit 23 determines that the necessity for the soft error measure for the variables belonging to the first group is greater than the necessity for the soft error measure for the variables belonging to the second group.

Output unit 25 outputs the determination result of determination unit 23. For example, output unit 25 displays the determination result on display 204.

Operation Example

Figure 8:
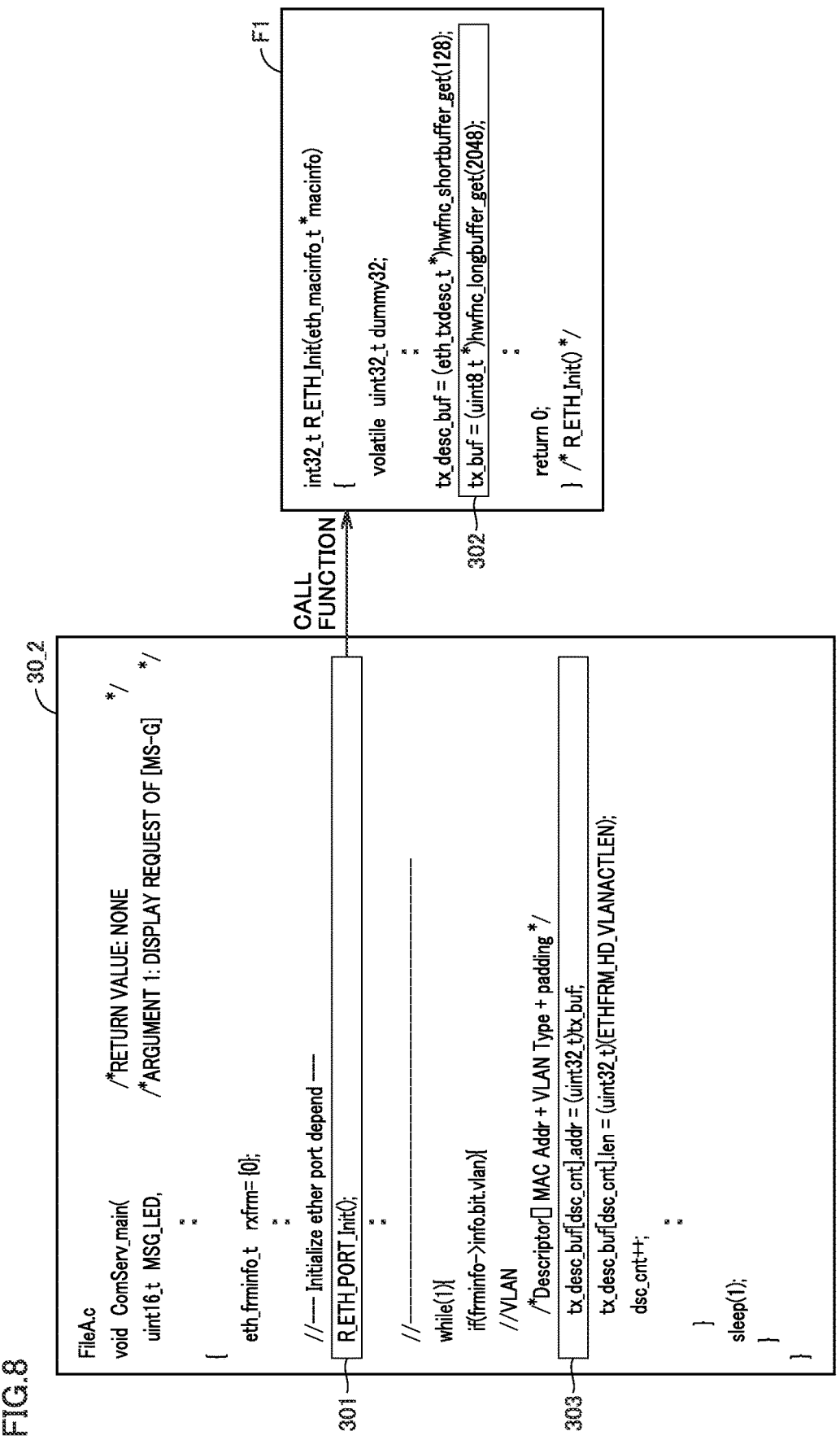
FIG. 8 is a diagram illustrating an example of a program assigned to a task.

Referring to FIGS. 8 to 10, an operation example of information processing device 200 will be described. FIG. 8 is a diagram illustrating an example of a program assigned to a task. FIG. 9 is a diagram illustrating an example of a classification result of variables. FIG. 10 is a diagram illustrating an example of a determination result displayed on the display.

FIG. 8 illustrates program 30_2 assigned to task A illustrated in FIG. 4. Processor 202 analyzes a plurality of commands included in program 30_2. The plurality of commands may include a command to read a function. In this case, processor 202 also analyzes a command included in the function to be read. Program 30_2 illustrated in FIG. 8 includes an expression 301 for calling a function F1.

Processor 202 specifies, from program 30_2, a command to write values of variables into the memory and a command to read values of variables from the memory. In the example illustrated in FIG. 8, processor 202 specifies, for a variable "tx_buf", an expression 302 for writing the value to the memory and an expression 303 for reading the value from the memory.

Processor 202 specifies the execution order of the plurality of commands by parsing of program 30_2. As a result, processor 202 recognizes that the execution order of expression 303 is later than the execution order of expression 302. That is, processor 202 recognizes that, for variable "tx_buf", expression 302 for writing the value into the memory is executed first. As a result, processor 202 classifies variable "tx_buf" into the second group.

In this way, processor 202 classifies each of one or more variables used to execute task A into either the first group or the second group as illustrated in FIG. 9. That is, processor 202 classifies the variables, such as variable "tx_buf", for which the expression for writing values into the memory is executed first into the second group. Note that the second group includes i) a variable for which both an expression for writing a value into the memory and an expression for reading the value from the memory are executed and the expression for writing the value into the memory is first executed, and ii) a variable for which only the expression for writing the value into the memory is executed. On the other hand, processor 202 classifies the variables for which the expression for reading the value from the memory is executed first into the first group. Note that the first group includes i) a variable for which both an expression for writing a value into the memory and an expression for reading the value from the memory are executed and the expression for reading the value from the memory is first executed, and ii) a variable for which only the expression for reading the value from the memory is executed.

Processor 202 determines the necessity for the soft error measure for the variable according to the classification result, and displays the determination result on display 204. As illustrated in FIG. 10, processor 202 displays the necessity for the soft error measure for the variable belonging to the first group as "great", and displays the necessity for the soft error measure for the variable belonging to the second group as "small". As a result, the user is only required to preferentially execute the soft error measure for the variable with the necessity displayed as "great".

In addition, processor 202 may include the data capacity indicating the value of each variable in the determination result. For example, when the soft error measure disclosed in PTL 1 is performed on the variable, the user can determine the specification of main memory 206 with reference to the data capacity included in the determination result.

<Modification>

In a task, a time from execution of the command to write a value of a certain variable in a memory to execution of the command to read the value of the variable from the memory is generally short. Therefore, the probability that the value of the variable corrupts due to a soft error during this period is low. Therefore, in the above-described embodiment, the necessity for the soft error measure for the variables belonging to the second group is uniformly determined to be "small".

However, there may be a program including a command (also referred to as a "standby command" below) to wait for a prescribed time between the command to write a value of a certain variable in the memory and the command to read the value of the variable from the memory. In the task to which such a program is assigned, the probability that the value of the variable corrupts due to a soft error during the execution of the standby command increases. In view of this, processor 202 may vary the necessity for the soft error measure for the variables belonging to the second group according to the length of the prescribed time of the standby command.

Figure 11:
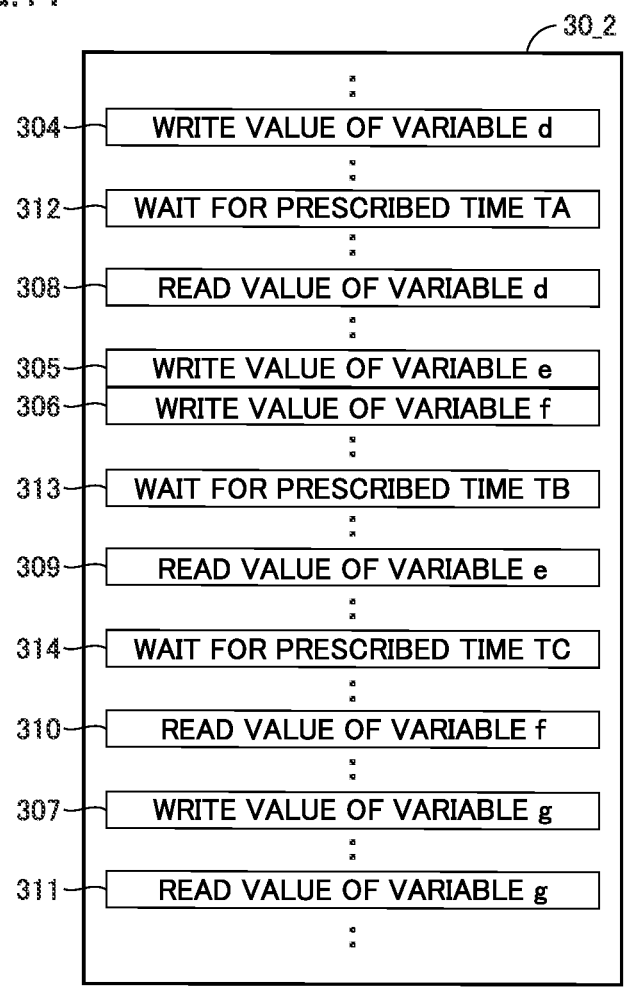
FIG. 11 is a diagram illustrating another example of the program assigned to a task.

FIG. 11 is a diagram illustrating another example of the program assigned to a task. Program 30_2 illustrated in FIG. 11 includes commands (referred to as "write commands" below) 304 to 307 to first write the values of variables d to g in the memory and commands (referred to as "read commands" below) 308 to 311 to first read the values of variables d to g from the memory. Further, program 30_2 includes standby commands 312, 313, and 314 to wait for prescribed times TA, TB, and TC, respectively. Prescribed time TA is shorter than prescribed time TB, and prescribed time TB is shorter than prescribed time TC. As illustrated in FIG. 11, write command 304, standby command 312, read command 308, write command 305, write command 306, standby command 313, read command 309, standby command 314, read command 310, write command 307, and read command 311 are executed in this order.

Program 30_2 includes write command 305 for the value of variable e, read command 309 for the value of variable e, and standby command 313 to wait for prescribed time TB, standby command 313 being executed between write command 305 and read command 309. In addition, program 30_2 includes write command 304 for the value of variable d, read command 308 for the value of variable d, and standby command 312 to wait for prescribed time TA (<TB), standby command 312 being executed between write command 304 and read command 308. Processor 202 determines that, according to these commands, the necessity for the soft error measure for variable e is greater than the necessity for the soft error measure for variable d.

Program 30_2 includes write command 306 for the value of variable f, read command 310 for the value of variable f, and standby commands 313 and 314 to wait for prescribed times TB and TC, respectively, standby commands 313 and 314 being executed between write command 306 and read command 310. In addition, program 30_2 includes write command 304 for the value of variable d, read command 308 for the value of variable d, and standby command 312 to wait for prescribed time TA (<TB+TC), standby command 312 being executed between write command 304 and read command 308. Processor 202 determines that, according to these commands, the necessity for the soft error measure for variable f is greater than the necessity for the soft error measure for variable d.

Program 30_2 includes write command 306 for the value of variable f, read command 310 for the value of variable f, and standby commands 313 and 314 to wait for prescribed times TB and TC, respectively, standby commands 313 and 314 being executed between write command 306 and read command 310. In addition, program 30_2 includes write command 305 for the value of variable e, read command 309 for the value of variable e, and standby command 313 to wait for prescribed time TB (<TB+TC), standby command 313 being executed between write command 305 and read command 309. Processor 202 determines that, according to these commands, the necessity for the soft error measure for variable f is greater than the necessity for the soft error measure for variable e.

In addition, program 30_2 includes write command 304 for the value of variable d, read command 308 for the value of variable d, and standby command 312 to wait for prescribed time TA (<TB), standby command 312 being executed between write command 304 and read command 308. Program 30_2 further includes write command 307 for the value of variable g and read command 311 for the value of variable g, and does not include a standby command between write command 307 and read command 311. Processor 202 determines that, according to these commands, the necessity for the soft error measure for variable d is greater than the necessity for the soft error measure for variable g.

Similarly, processor 202 determines that the necessity for the soft error measure for variables e and f is greater than the necessity for the soft error measure for variable g.

FIG. 12 is a diagram illustrating an example of a determination result in the modification. As illustrated in FIG. 12, processor 202 determines that the necessity for the soft error measure for the variable for which the standby command is not executed between the write command and the read command among the variables belonging to the first group is "small". On the other hand, processor 202 determines that the necessity for the soft error measure for the variable for which the standby command is executed between the write command and the read command among the variables belonging to the first group is "medium".

Further, processor 202 adds, to the necessity "medium", a level value that is greater as the total of prescribed times of the standby commands executed between the write command and the read command is longer. As the level value is greater, the necessity of the soft error measure is greater. As a result, the user can confirm the necessity for the soft error measure by checking the level value.

§ 3 Supplementary Matter

As described above, the present embodiment includes the following disclosures.

(Configuration 1)

An information processing device (200) including:
an analysis unit (20, 202) configured to parse a program assigned to a task that is periodically executed by a task execution device (100); and
an output unit (25, 202) configured to output an analysis result by the analysis unit (20, 202),
wherein the analysis unit (20, 202) includes
an extraction unit (21, 202) configured to extract at least one variable used to execute the task,
a classification unit (22, 202) configured to classify each of the at least one variable into a first group in which a process of reading a value from a memory is performed first during execution of the task and a second group in which a process of writing a value to the memory is performed first during execution of the task, and
a determination unit (23, 202) configured to determine that necessity for a soft error measure for a variable belonging to the first group is greater than necessity for a soft error measure for a variable belonging to the second group, and
the output unit (25, 202) outputs a determination result by the determination unit.

(Configuration 2)

The information processing device (200) according to configuration 1, wherein
the at least one variable includes a first variable and a second variable that belong to the second group, and
the determination unit (23, 202) determines that necessity for the soft error measure for the first variable is greater than necessity for the soft error measure for the second variable according to the program including a first command to first write a value of the first variable into the memory, a second command to wait for a first prescribed time after the first command, a third command to read the value of the first variable from the memory after the second command, a fourth command to first write a value of the second variable into the memory, a fifth command to wait for a second prescribed time shorter than the first prescribed time after the fourth command, and a sixth command to read the value of the second variable from the memory after the fifth command.

(Configuration 3)

The information processing device (200) according to configuration 1, wherein
the at least one variable includes a first variable and a second variable that belong to the second group, and
the determination unit (23, 202) determines that necessity for the soft error measure for the first variable is greater than necessity for the soft error measure for the second variable according to the program including a first command to first write a value of the first variable into the memory, a second command to wait for a first prescribed time after the first command, a third command to read the value of the first variable from the memory after the second command, a fourth command to first write a value of the second variable into the memory, and a fifth command to read the value of the second variable from the memory after the fourth command, and not including a command to wait for a prescribed time between the fourth command and the fifth command.

(Configuration 4)

An information processing method performed by an information processing device (200), the method including:
parsing a program assigned to a task that is periodically executed by a task execution device (100); and
outputting a parsing result,
wherein the parsing includes
extracting at least one variable used to execute the task,
classifying each of the at least one variable into a first group in which a process of reading a value from a memory is performed first during execution of the task and a second group in which a process of writing a value to the memory is performed first during execution of the task, and
determining that necessity for a soft error measure for a variable belonging to the first group is greater than necessity for a soft error measure for a variable belonging to the second group, and
the outputting includes outputting a determination result by the determining.

(Configuration 5)

A program for causing a computer to execute the information processing method according to configuration.

While the embodiment of the present invention has been described, it should be understood that the embodiment disclosed herein is illustrative in all respects and not restrictive. The scope of the present invention is defined by the claims, and is intended to include meanings equivalent to the claims and all modifications within the scope.

REFERENCE SIGNS LIST

1: control system, 2: field network, 20: analysis unit, 21: extraction unit, 22: classification unit, 23: determination unit, 25: output unit, 30: program, 32: analysis program, 34: system program, 36: task information, 100: control device, 102, 202: processor, 104: chipset, 106, 206: main memory, 108, 208: storage, 110: higher order network controller, 112, 212: USB controller, 114: memory card interface, 116: memory card, 120: internal bus controller, 122: I/O unit, 130: field network controller, 200: information processing device, 204: display, 210: internal bus, 214: input device, 218: support program, 301, 302, 303: expression, 304 to 307: write command, 308 to 311: read command, 312 to 314: standby command, 500: field device, 510: remote I/O device, 520: robot, 522: robot controller, 530: CNC machine tool, 532: servomotor, 534: conveyor, 536: workpiece table, 538: servo driver

The invention claimed is:

1. An information processing device comprising:
an analysis unit configured to parse a program assigned to a task that is periodically executed by a task execution device; and
an output unit configured to output an analysis result by the analysis unit,
wherein the analysis unit includes
an extraction unit configured to extract at least one variable used to execute the task,
a classification unit configured to classify each of the at least one variable into a first group in which a process of reading a value from a memory is performed first during execution of the task and a second group in which a process of writing a value to the memory is performed first during execution of the task, and
a determination unit configured to determine that necessity for a soft error measure for a variable belonging to the first group is greater than necessity for a soft error measure for a variable belonging to the second group, and
the output unit outputs a determination result by the determination unit.

2. The information processing device according to claim 1, wherein
the at least one variable includes a first variable and a second variable that belong to the second group, and
the determination unit determines that necessity for the soft error measure for the first variable is greater than necessity for the soft error measure for the second variable according to the program including a first command to first write a value of the first variable into the memory, a second command to wait for a first prescribed time after the first command, a third command to read the value of the first variable from the memory after the second command, a fourth command to first write a value of the second variable into the memory, a fifth command to wait for a second prescribed time shorter than the first prescribed time after the fourth command, and a sixth command to read the value of the second variable from the memory after the fifth command.

3. The information processing device according to claim 1, wherein
the at least one variable includes a first variable and a second variable that belong to the second group, and
the determination unit determines that necessity for the soft error measure for the first variable is greater than necessity for the soft error measure for the second variable according to the program including a first command to first write a value of the first variable into the memory, a second command to wait for a first prescribed time after the first command, a third command to read the value of the first variable from the memory after the second command, a fourth command to first write a value of the second variable into the memory, and a fifth command to read the value of the second variable from the memory after the fourth command, and not including a command to wait for a prescribed time between the fourth command and the fifth command.

4. An information processing method performed by an information processing device, the method comprising:
parsing a program assigned to a task that is periodically executed by a task execution device; and
outputting a parsing result,
wherein the parsing includes
extracting at least one variable used to execute the task,
classifying each of the at least one variable into a first group in which a process of reading a value from a memory is performed first during execution of the task and a second group in which a process of writing a value to the memory is performed first during execution of the task, and
determining that necessity for a soft error measure for a variable belonging to the first group is greater than necessity for a soft error measure for a variable belonging to the second group, and
the outputting includes outputting a determination result by the determining.

5. A non-transitory computer-readable storage medium storing a program for causing a computer to execute the information processing method according to claim 4.

\* \* \* \* \*